May 2, 1950     C. W. HULL     2,506,217
SUSPENSION DEVICE FOR VEHICLES
Filed Dec. 18, 1945     2 Sheets-Sheet 1
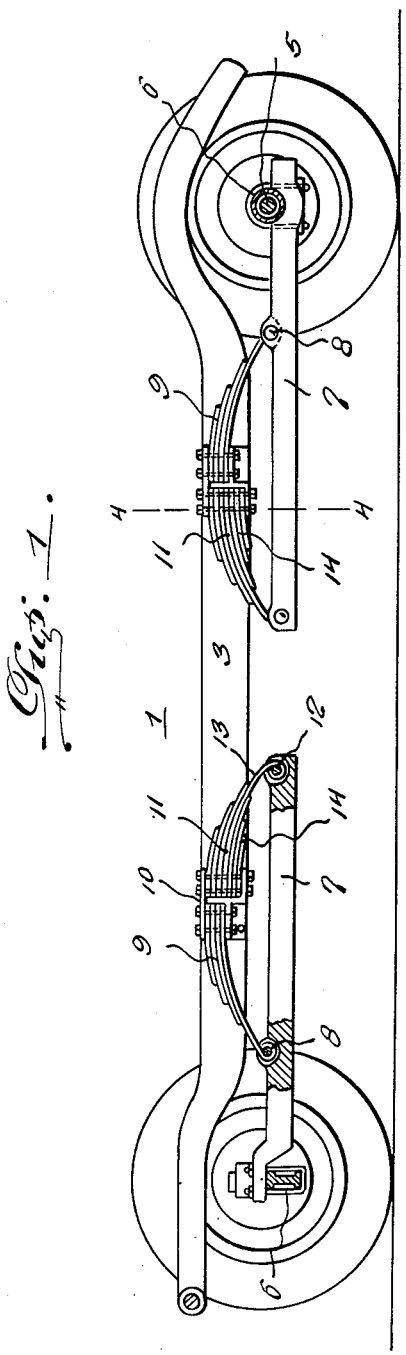
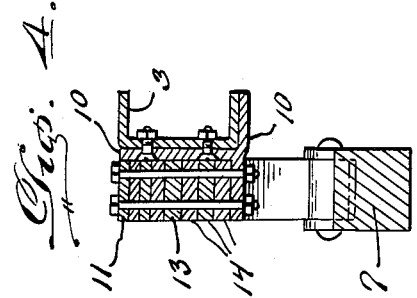
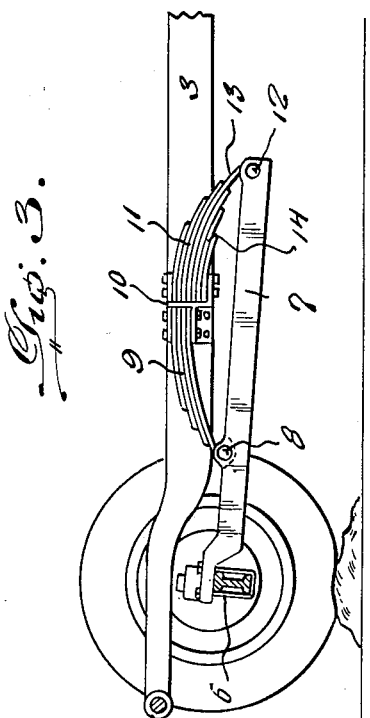
Inventor
Clarence W. Hull,
Attorneys May 2, 1950            C. W. HULL            2,506,217
SUSPENSION DEVICE FOR VEHICLES
Filed Dec. 18, 1945            2 Sheets-Sheet 2
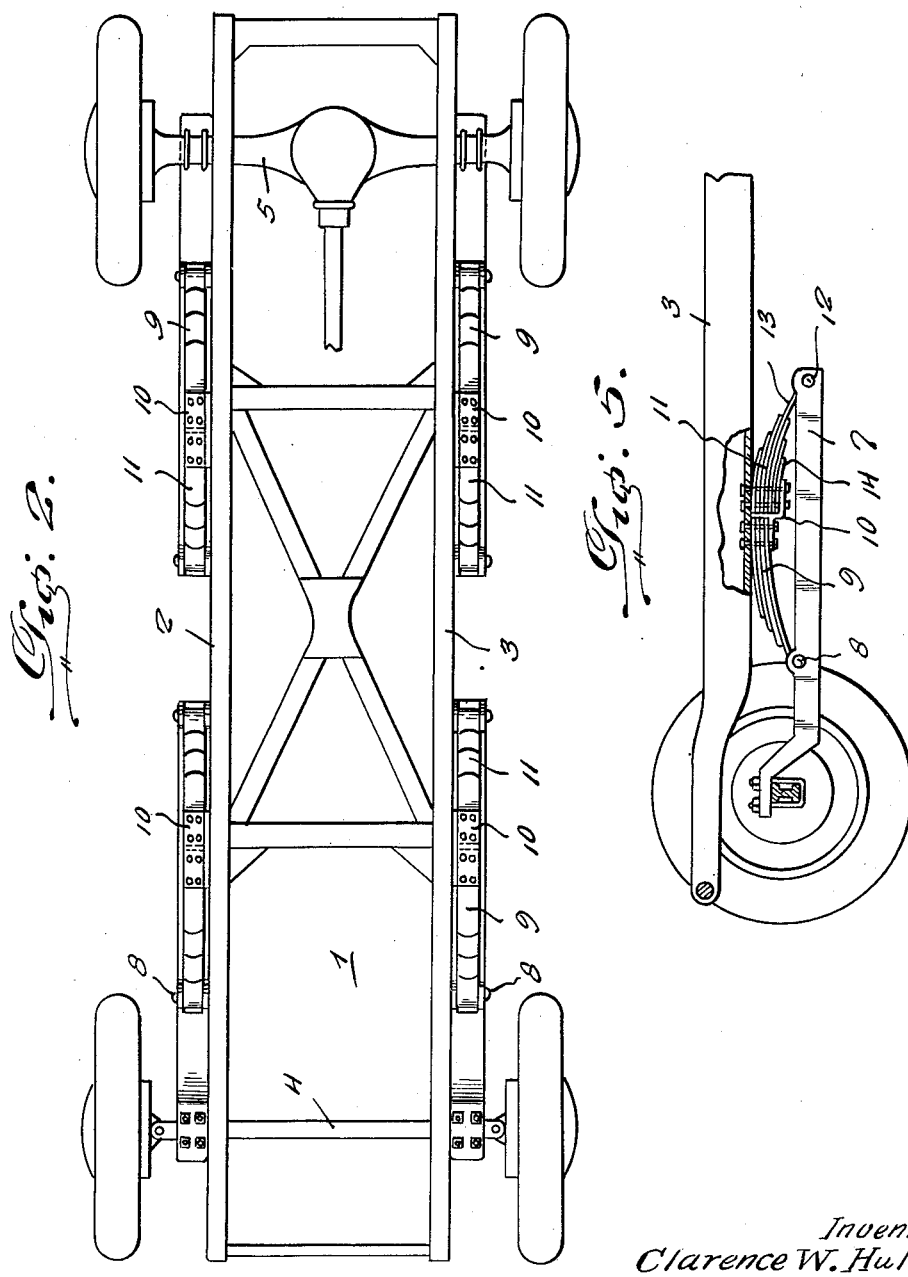
Inventor
Clarence W. Hull,
By *McMorrow, Berman & Davidson*
Attorneys Patented May 2, 1950

2,506,217

UNITED STATES PATENT OFFICE 2,506,217

SUSPENSION DEVICE FOR VEHICLES

Clarence W. Hull, Chicago, Ill.

Application December 18, 1945, Serial No. 635,633

4 Claims. (Cl. 267—19)

The present invention relates to a device for the suspension of vehicles and is more particularly concerned with a device of the character referred to which is resilient.

The primary object of the invention is to provide a resilient suspension device especially adaptable to automobiles for the purpose of making them ride smoother.

Another object of the invention is to provide a resilient suspension for vehicles, of simpler and more compact construction than what is disclosed by prior devices.

With the foregoing and other objects and advantages in view, the invention consists of the novel construction and arrangement of parts hereinafter described and claimed.

In the accompanying drawing illustrating the invention:

Figure 1 is a side elevation of the invention applied to the sides of the side bars of an automobile chassis.

Figure 2 is a top plan view thereof.

Figure 3 is a fragmentary side elevation illustrating operation of the device on an uneven road surface.

Figure 4 is a vertical section on line 4—4 of Figure 1.

Figure 5 is a fragmentary side elevation illustrating the device as attached to the underside of a chassis side bar.

Like numerals in the description and drawing are employed to designate the same parts of construction.

1 represents the chassis of an automobile, 2 and 3 the longitudinal side frame members thereof, 4 the front axle and 5 the rear axle.

Secured to either top or under side of each axle by clips 6 or other suitable means, are a pair of pressure bars 7 located outside of the chassis and between same and the wheels of the auto. The front pressure bars are attached at their forward ends to the front axle while the rear pressure bars are attached at their rear ends to the rear axle, thus the free ends of all four pressure bars project toward the middle of the chassis and parallel to its side frame members 2 and 3. The length of these pressure bars will be suited to the type and weight of the vehicle.

Pivotally secured at one end to each of the forward pressure bars, a suitable distance back of the front ends, and on top thereof, as at 8, is a quarter elliptical, multiple leaf spring element 9, comprising a main leaf and superimposed stub leaves of diminished length constructed to suit the requirement of type and weight of the vehicle. This element is secured at the end opposite its pivotal connection, in a spring socket provided by a bracket 10 which is constructed to be bolted to a side bar of the chassis, either on its outer side, as shown in Figure 1 or on its under side, as shown in Figure 5.

The said bracket is constructed with two oppositely facing leaf-spring sockets, one for the butt end of the above-described spring element and a second for the butt end of another quarter elliptical, multi-leaf spring element 11, which is pivotally connected at its opposite end to the top of the rear end of the front pressure bar, as at 12, said connection being aligned with the pivotal connection 8 of the spring element 9.

The element 11 comprises a main leaf 13 and superimposed stub recoil leaves, similar to the element 9, for the rebound, and pressure stub leaves 14 on the under side of the main leaf 13. The leaf spring elements 9 and 11, when combined and secured in place as aforesaid constitute a single spring-assembly unit, which takes care of the ordinary vibrations of a vehicle and also unusual jolts and rebounds due to unevenness or irregularities usually encountered on road surfaces.

The spring-assembly unit for the rear portion of the vehicle, is similar to the above-described unit, but reversed in its position on the rear pressure bars, that is to say, the quarter elliptical leaf-spring element 11 is pivotally secured at its forward end, to the forward end of the pressure bar and the butt end of said element is secured in the front socket of the bracket 10, which sockets are adapted thereto, while the reversed spring element 9 is secured, at its forward butt end, in the rear socket of the bracket and at the other end the main leaf is pivotally secured to the pressure bar at a suitable distance from the rear axle.

It will be noted that the construction and arrangement of the parts of each of the spring assembly units positions the bracket in a substantially mid-way location between the outer extremities of the main leaves of the two quarter elliptical springs 9 and 11, thus effecting an even distribution of the load on the two springs and the corresponding main leaves constitute the sole connection between each pressure bar and the corresponding chassis side frame member.

In operation, where the wheels of the vehicle encounter a hump or uneven place on the road, the jolt caused thereby is back of the front and rear axles, which places it somewhere between, or about the middle of the chassis. When the wheels hit a hump, as illustrated in Figure 3, the spring element 9 will be subjected to tension by upward movement of the front end of the pressure bar and at the same time the element 11 will be drawn down by downward movement of the free end of the pressure bar, thus subjecting it to tension.

As soon as the hump is passed over and the forward wheel or wheels drop to normal positions, the rear spring element 11 serves to cushion the shock of the rebound and thereby takes it off the chassis. When the rear wheels encounter the hump, the action of the two elements of the rear spring assembly unit will be similar to what has been explained for the forward assembly unit, but in reverse because of the mounting of the rear units reversely.

Having thus described my invention, what I claim as new and desire to secure by Letters Patent is:

1. The combination with a road vehicle having a chassis frame including a pair of side frame members and an axle transversely disposed below the frame, of spring-suspension means operatively interposed between the vehicle chassis frame and such axle comprising a pair of pressure bars disposed one adjacent each of the side frame members and each secured at one end to the axle and a respective spring assembly operatively interposed between each pressure bar and the corresponding chassis side frame member, each of said spring assemblies comprising a spring bracket mounted on the corresponding chassis side frame member and providing a pair of oppositely facing spring sockets, two quarter elliptical leaf-springs each having its butt end secured in a corresponding bracket socket so that said springs extend in opposite directions from said bracket and longitudinally of the frame side member, and a respective pivotal connection between the distal end of each spring and the corresponding pressure bar.

2. The combination with a road vehicle having a chassis frame including a pair of side frame members and an axle transversely disposed below the frame, of spring-suspension means operatively interposed between the vehicle chassis frame and such axle comprising a pair of front pressure bars disposed one adjacent each of the side frame members and each secured at one end to the axle and a respective spring assembly operatively interposed between each pressure bar and the corresponding chassis side frame member, each of said spring assemblies comprising a spring bracket mounted on the corresponding chassis side frame member and providing two oppositely facing spring sockets, two quarter elliptical, multi-leaf springs each having its butt end secured in a corresponding bracket socket, each of said springs having a main leaf, and said spring adjacent the axle attached end of said pressure bar having pressure leaves above the main leaf thereof with the other spring having pressure leaves below and recoil leaves above the main leaf thereof, and a respective pivotal connection between the distal end of each of said main leaves and the corresponding pressure bar.

3. The combination with a road vehicle having a chassis frame including a pair of side frame members and an axle transversely disposed below the frame, of spring-suspension means operatively interposed between the vehicle chassis frame and such axle comprising a pair of front pressure bars disposed one adjacent each of the side frame members and each secured at one end to the vehicle axle and a respective spring assembly operatively interposed between each pressure bar and the corresponding chassis side frame member, each of such spring assemblies comprising two quarter elliptical, multi-leaf springs arranged in end-to-end relationship to extend longitudinally of the corresponding chassis side frame member with their butt ends proximately disposed, means securing the butt ends of said springs to the corresponding side frame member, and a pivotal connection between the distal end of each spring and the corresponding pressure bar.

4. The combination with a road vehicle having a chassis frame including a pair of side frame members and an axle transversely disposed below the frame, of spring-suspension means operatively interposed between the vehicle chassis frame and such axle comprising a pair of front pressure bars disposed one adjacent each of the side frame members and each secured at one end to the vehicle axle and a respective spring assembly operatively interposed between each pressure bar and the corresponding chassis side frame member, each of such spring assemblies comprising two quarter elliptical, multi-leaf springs arranged in end-to-end relationship to extend longitudinally of the corresponding chassis side frame member with their butt ends proximately disposed, means securing the butt ends of said springs to the corresponding side frame member, and a pivotal connection between the distal end of each spring and the corresponding pressure bar, one of said pivotal connections being disposed adjacent the end of said pressure bar remote from the corresponding axle.

CLARENCE W. HULL.

REFERENCES CITED

The following references are of record in the file of this patent:

UNITED STATES PATENTS

| Number | Name | Date |
|---|---|---|
| 884,488 | Hancock | Apr. 14, 1908 |
| 1,408,701 | Honecker | May 7, 1922 |
| 1,425,849 | Gauthier | Aug. 15, 1922 |
| 1,501,457 | Kaestner | July 15, 1924 |
| 1,623,422 | Lovejoy | Apr. 5, 1927 |

FOREIGN PATENTS

| Number | Country | Date |
|---|---|---|
| 306,833 | Germany | Feb. 13, 1920 |
| 624,500 | France | Apr. 9, 1927 |